(12) United States Patent
Lim et al.

(10) Patent No.: US 11,882,882 B2
(45) Date of Patent: Jan. 30, 2024

(54) METHOD OF CONTROLLING AEROSOL GENERATING DEVICE WITH A PLURALITY OF GEOMAGNETIC SENSORS AND AEROSOL GENERATING DEVICE CONTROLLED THEREBY

(71) Applicant: KT&G CORPORATION, Daejeon (KR)

(72) Inventors: Hun Il Lim, Seoul (KR); Tae Hun Kim, Yongin-si (KR); Hyung Jin Jung, Seoul (KR); Jae Sung Choi, Hanam-si (KR); Jung Ho Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 764 days.

(21) Appl. No.: 16/959,248

(22) PCT Filed: Nov. 8, 2019

(86) PCT No.: PCT/KR2019/015140
§ 371 (c)(1),
(2) Date: Jun. 30, 2020

(87) PCT Pub. No.: WO2020/149505
PCT Pub. Date: Jul. 23, 2020

(65) Prior Publication Data
US 2021/0227889 A1   Jul. 29, 2021

(30) Foreign Application Priority Data
Jan. 16, 2019   (KR) .................. 10-2019-0005865

(51) Int. Cl.
*A24F 40/53*   (2020.01)
*A24F 40/51*   (2020.01)
(Continued)

(52) U.S. Cl.
CPC ............. *A24F 40/53* (2020.01); *A24D 1/20* (2020.01); *A24F 40/10* (2020.01); *A24F 40/20* (2020.01);
(Continued)

(58) Field of Classification Search
None
See application file for complete search history.

(56) References Cited

U.S. PATENT DOCUMENTS 9,886,011 B2   2/2018   Park et al.
10,159,283 B2   12/2018   Mironov
(Continued)

FOREIGN PATENT DOCUMENTS

CN   104885039 A   9/2015
CN   106455714 A   2/2017
(Continued)

OTHER PUBLICATIONS

International Search Report for PCT/KR2019/015140 dated Feb. 19, 2020 [PCT/ISA/210].
(Continued)

*Primary Examiner* — Kelly M Gambetta
*Assistant Examiner* — Katherine A Will
(74) *Attorney, Agent, or Firm* — Sughrue Mion, PLLC (57) ABSTRACT

An aerosol generating device according to an embodiment includes a heater generating an aerosol by heating an aerosol generating substrate; a controller for controlling power supplied to the heater; at least one detachable element that is attachable to and detachable from an inner space or an outer space of the aerosol generating device; and a plurality of geomagnetic sensors for detecting changes in the strength of an internal magnetic field of the aerosol generating device, wherein the controller detects detachment of the
(Continued)

detachable element based on a detection result from at least one of the plurality of geomagnetic sensors.

20 Claims, 9 Drawing Sheets (51) Int. Cl.
A24F 40/10 (2020.01)
A24F 40/20 (2020.01)
A24F 40/57 (2020.01)
A24F 40/30 (2020.01)
A24F 40/42 (2020.01)
A24D 1/20 (2020.01)
G01V 3/40 (2006.01)
H05B 1/02 (2006.01)

(52) U.S. Cl.
CPC ............ A24F 40/30 (2020.01); A24F 40/42 (2020.01); A24F 40/51 (2020.01); A24F 40/57 (2020.01); G01V 3/40 (2013.01); H05B 1/0252 (2013.01)

(56) References Cited

U.S. PATENT DOCUMENTS

| 10,758,685 | B2 | 9/2020 | Kinoshita et al. |
| 10,959,463 | B2 | 3/2021 | Mironov |
| 2014/0283825 | A1 | 9/2014 | Buchberger |
| 2016/0050976 | A1 | 2/2016 | Righetti |
| 2017/0108840 | A1 | 4/2017 | Hawes et al. |
| 2017/0181223 | A1 | 6/2017 | Sur et al. |
| 2018/0154103 | A1 | 6/2018 | Davis |
| 2019/0261682 | A1 | 8/2019 | Gimkiewicz et al. |
| 2019/0314703 | A1* | 10/2019 | Onuki ................. A63B 69/3632 |
| 2019/0380390 | A1 | 12/2019 | Jeong et al. |
| 2020/0000152 | A1* | 1/2020 | Mironov ................ A24F 40/465 |
| 2020/0120987 | A1 | 4/2020 | Atkins et al. |
| 2022/0087310 | A1 | 3/2022 | Han et al. |

FOREIGN PATENT DOCUMENTS

| CN | 107847689 A | 3/2018 |
| CN | 208192126 U | 12/2018 |
| JP | 10126971 A | 5/1998 |
| JP | 2010057637 A | 3/2010 |
| JP | 2015-013192 A | 1/2015 |
| JP | 2016515392 A | 5/2016 |
| JP | 2017515488 A | 6/2017 |
| KR | 10-2016-0102293 A | 8/2016 |
| KR | 10-2018-0033141 A | 4/2018 |
| KR | 10-2018-0044978 A | 5/2018 |
| KR | 10-2018-0054581 A | 5/2018 |
| KR | 10-2018-0085648 A | 7/2018 |
| WO | 2016152199 A1 | 9/2016 |
| WO | 2016/187695 A1 | 12/2016 |
| WO | 2017/037457 A1 | 3/2017 |
| WO | 2017/045899 A1 | 3/2017 |

OTHER PUBLICATIONS

Extended European Search Report dated Mar. 23, 2022 in European Application No. 19910154.4.
Communication dated Jun. 22, 2021, from the Japanese Patent Office in application No. 2020526263.
Office Action dated Dec. 5, 2022 from the Chinese Patent Office in Application No. 201980006382.X.

* cited by examiner

METHOD OF CONTROLLING AEROSOL GENERATING DEVICE WITH A PLURALITY OF GEOMAGNETIC SENSORS AND AEROSOL GENERATING DEVICE CONTROLLED THEREBY

CROSS REFERENCE TO RELATED APPLICATIONS

This application is a National Stage of International Application No. PCT/KR2019/015140 filed Nov. 8, 2019, claiming priority based on Korean Patent Application No. 10-2019-0005865 filed Jan. 16, 2019.

TECHNICAL FIELD

The present disclosure relates to a method of controlling an aerosol generating device using a plurality of geomagnetic sensors and an aerosol generating device having the same, and more particularly, to a method of controlling an aerosol generating device having a plurality of geomagnetic sensors, based on a result detected by the geomagnetic sensors, and an aerosol generating device in which the method is implemented.

BACKGROUND ART

Recently, demand for alternative ways of overcoming the disadvantages of traditional cigarettes has increased. For example, there is growing demand for a method of generating aerosol by heating an aerosol generating material in cigarettes, rather than by combusting cigarettes. Accordingly, research into a heating-type cigarette or a heating-type aerosol generator has been actively conducted.

In particular, an aerosol generating device includes a number of elements that are detachable from the aerosol generating device, including cigarettes. The controller of the aerosol generating device needs to sensitively detect whether such detachable elements are detached from the aerosol generating device. When the detachable elements are detached, the controller must promptly provide an alarm to a user through a display unit, a vibration unit, and a sound output unit provided in the aerosol generating device. However, when the sensitivity of the sensor is not secured above a certain level, the controller cannot provide the alarm to the user in a timely manner.

DESCRIPTION OF EMBODIMENTS

Technical Problem

The technical problem to be solved by the present disclosure is to provide a method for effectively controlling an aerosol generating device based on a result detected by a plurality of geomagnetic sensors and an aerosol generating device controlled by the method.

Solution to Problem

An aerosol generating device according to an embodiment of the present disclosure for solving the above technical problem, the aerosol generating device includes a heater generating an aerosol by heating an aerosol generating substrate; a controller for controlling power supplied to the heater; at least one detachable element that is attachable to and detachable from an inner space or an outer space of the aerosol generating device; and a plurality of geomagnetic sensors for detecting changes in the strength of an internal magnetic field of the aerosol generating device, wherein the controller detects detachment of the detachable element based on a detection result from at least one of the plurality of geomagnetic sensors.

A method of controlling an aerosol generating device with a plurality of geomagnetic sensors according to another embodiment of the present disclosure for solving the above technical problem, the method includes detecting detachment of at least one detachable element that is attachable to and detachable from an inner space or an outer space of the aerosol generating device; detecting, with the plurality of geomagnetic sensors, a change in an internal magnetic field strength of the aerosol generating device due to the detachment; and identifying the detachable element, based on a detection result from at least one of the plurality of geomagnetic sensors.

In addition, an aerosol generating device using a cigarette or a cigarette according to another embodiment of the present disclosure may be provided to a user to solve the above technical problem.

Advantageous Effects of Disclosure

According to the present disclosure, by controlling the operation of an aerosol generating device, based on results detected by a plurality of high-sensitivity geomagnetic sensors, the error rate of the controller is lowered, and the user may be provided with a message accurately informing the situation of the detachable element being attached to the aerosol generating device or the detachable element being detached from the aerosol generating device.

BEST MODE

An aerosol generating device according to an embodiment of the present disclosure for solving the above technical problem, the aerosol generating device includes a heater generating an aerosol by heating an aerosol generating substrate; a controller for controlling power supplied to the heater; at least one detachable element that is attachable to and detachable from an inner space or an outer space of the aerosol generating device; and a plurality of geomagnetic sensors for detecting changes in the strength of an internal magnetic field of the aerosol generating device, wherein the controller detects detachment of the detachable element based on a detection result from at least one of the plurality of geomagnetic sensors.

A method of controlling an aerosol generating device with a plurality of geomagnetic sensors according to another embodiment of the present disclosure for solving the above technical problem, the method includes detecting detachment of at least one detachable element that is attachable to and detachable from an inner space or an outer space of the aerosol generating device; detecting, with the plurality of geomagnetic sensors, a change in an internal magnetic field strength of the aerosol generating device due to the detachment; and identifying the detachable element, based on a detection result from at least one of the plurality of geomagnetic sensors.

Mode of Disclosure

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Figure 1:
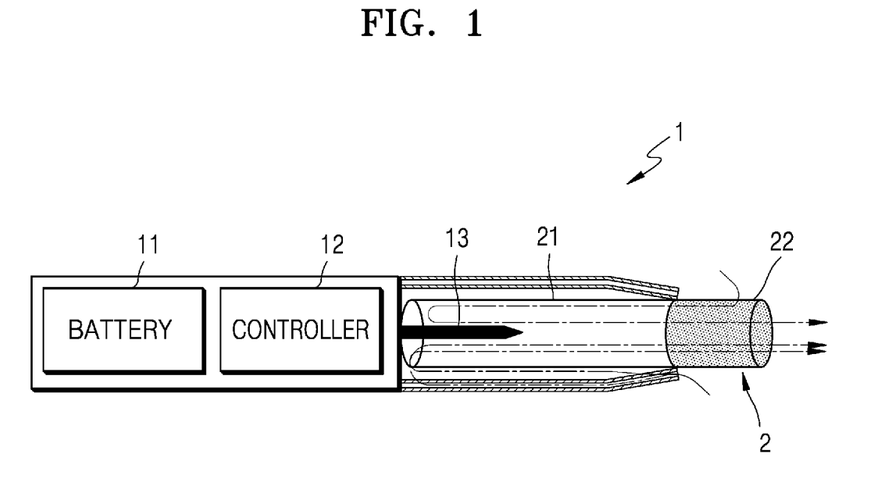
FIGS. 1 through 3 are diagrams showing examples in which a cigarette is inserted into an aerosol generating device.
Figure 2:
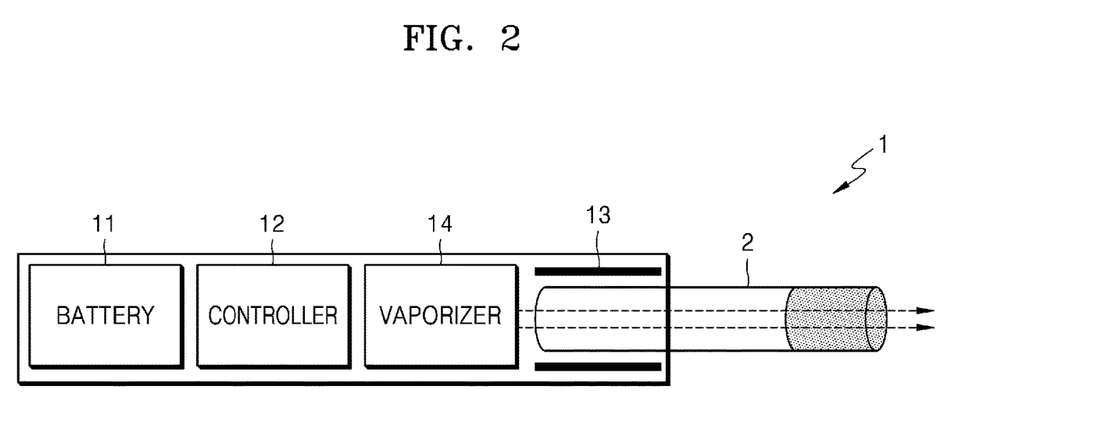
Figure 3:
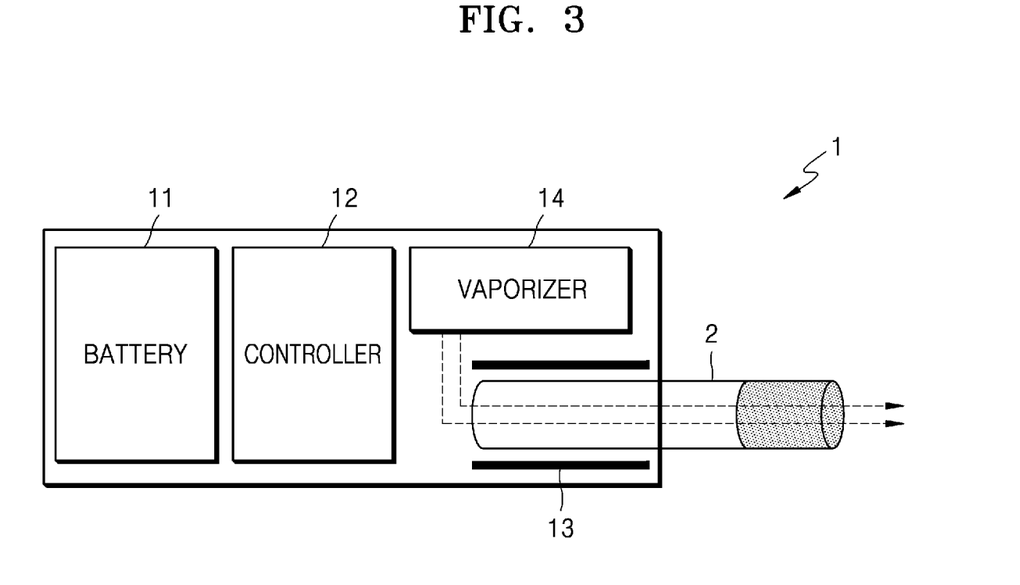

FIGS. 1 through 3 are diagrams showing examples in which a cigarette is inserted into an aerosol generating device.

Referring to FIG. 1, an aerosol generator 1 includes a battery 11, a controller 12, and a heater 13. Referring to FIG. 2 and FIG. 3, the aerosol generator 1 further includes a vaporizer 14. Also, a cigarette 2 may be inserted into an inner space of the aerosol generator 1.

The elements related to the embodiment are illustrated in the aerosol generator 1 of FIGS. 1 to 3. Therefore, one of ordinary skill in the art would appreciate that other universal elements than the elements shown in FIGS. 1 to 3 may be further included in the aerosol generator 1.

Also, FIGS. 2 and 3 show that the aerosol generator 1 includes the heater 13, but if necessary, the heater 13 may be omitted.

In FIG. 1, the battery 11, the controller 12, and the heater 13 are arranged in a row. Also, FIG. 2 shows that the battery 11, the controller 12, the vaporizer 14, and the heater 13 are arranged in a row. Also, FIG. 3 shows that the vaporizer 14 and the heater 13 are arranged in parallel with each other. However, an internal structure of the aerosol generator 1 is not limited to the examples shown in FIGS. 1 to 3. That is, according to a design of the aerosol generator 1, arrangement of the battery 11, the controller 12, the heater 13, and the vaporizer 14 may be changed.

When the cigarette 2 is inserted into the aerosol generator 1, the aerosol generator 1 operates the heater 13 and/or the vaporizer 14 to generate aerosol from the cigarette 2 and/or the vaporizer 14. The aerosol generated by the heater 13 and/or the vaporizer 14 may be transferred to a user via the cigarette 2.

If necessary, even when the cigarette 2 is not inserted in the aerosol generator 1, the aerosol generator 1 may heat the heater 13.

The battery 11 supplies the electric power used to operate the aerosol generator 1. For example, the battery 11 may supply power for heating the heater 13 or the vaporizer 14 and supply power for operating the controller 12. In addition, the battery 11 may supply power for operating a display, a sensor, a motor, and the like installed in the aerosol generator 1.

The controller 12 controls the overall operation of the aerosol generator 1. In detail, the controller 12 may control operations of other elements included in the aerosol generator 1, as well as the battery 11, the heater 13, and the vaporizer 14. Also, the controller 12 may check the status of each component in the aerosol generator 1 to determine whether the aerosol generator 1 is in an operable state.

The controller 12 includes at least one processor. A processor can be implemented as an array of a plurality of logic gates or can be implemented as a combination of a general-purpose microprocessor and a memory in which a program executable in the microprocessor is stored. It will be understood by one of ordinary skill in the art that the present disclosure may be implemented in other forms of hardware.

The heater 13 may be heated by the electric power supplied from the battery 11. For example, when the cigarette is inserted in the aerosol generator 1, the heater 13 may be located outside the cigarette. Therefore, the heated heater 13 may raise the temperature of an aerosol generating material in the cigarette.

The heater 13 may be an electro-resistive heater. For example, the heater 13 includes an electrically conductive track, and the heater 13 may be heated as a current flows through the electrically conductive track. However, the heater 13 is not limited to the above example, and any type of heater may be used provided that the heater is heated to a desired temperature. Here, the desired temperature may be set in advance on the aerosol generator 1, or may be set by a user.

In addition, in another example, the heater 13 may include an induction heating type heater. In detail, the heater 13 may include an electrically conductive coil for heating the cigarette in an induction heating method, and the cigarette may include a susceptor that may be heated by the induction heating type heater.

For example, the heater may include a tubular type heating element, a plate type heating element, a needle type heating element, or a rod type heating element, and may heat the inside or outside of the cigarette 2 according to the shape of the heating element.

Also, there may be a plurality of heaters 130 in the aerosol generator 1. Here, the plurality of heaters 130 may be arranged to be inserted into the cigarette 2 or on the outside of the cigarette 2. Also, some of the plurality of heaters 130 may be arranged to be inserted into the cigarette 2 and the other may be arranged on the outside of the cigarette 2. In addition, the shape of the heater 13 is not limited to the example shown in FIGS. 1 to 3, but may be manufactured in various shapes.

The vaporizer 14 may generate aerosol by heating a liquid composition and the generated aerosol may be delivered to the user after passing through the cigarette 2. In other words, the aerosol generated by the vaporizer 14 may move along an air flow passage of the aerosol generator 1, and the air flow passage may be configured for the aerosol generated by the vaporizer 14 to be delivered to the user through the cigarette For example, the vaporizer 14 may include a liquid storage unit, a liquid delivering unit, and a heating element, but is not limited thereto. For example, the liquid storage unit, the liquid delivering unit, and the heating element may be included in the aerosol generator 1 as independent modules.

The liquid storage may store a liquid composition. For example, the liquid composition may be a liquid including a tobacco containing material including a volatile tobacco flavor component, or a liquid including a non-tobacco material. The liquid storage unit may be detachable from the vaporizer 14 or may be integrally manufactured with the vaporizer 14.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but is not limited thereto.

In addition, the aerosol generator 1 may further include universal elements, in addition to the battery 11, the controller 12, the heater 13, and the vaporizer 14. For example, the aerosol generator 1 may include a display capable of outputting visual information and/or a motor for outputting tactile information. In addition, the aerosol generator 1 may include at least one sensor (a puff sensor, a temperature sensor, a cigarette insertion sensor, etc.) Also, the aerosol generator 1 may be manufactured to have a structure, in which external air may be introduced or internal air may be discharged even in a state where the cigarette 2 is inserted.

Although not shown in FIGS. 1 to 3, the aerosol generator 1 may configure a system with an additional cradle. For example, the cradle may be used to charge the battery 11 of the aerosol generator 1. Alternatively, the heater 13 may be heated while the cradle and the aerosol generator 1 are coupled to each other.

The cigarette 2 may be similar to a typical burning cigarette. For example, the cigarette 2 may include a first portion containing an aerosol generating material and a second portion including a filter and the like. The second portion of the cigarette 2 may also include the aerosol generating material. For example, an aerosol generating material made in the form of granules or capsules may be inserted into the second portion.

The entire first portion may be inserted into the aerosol generator 1 and the second portion may be exposed to the outside. Alternatively, only a portion of the first portion may be inserted into the aerosol generator 1 or the entire first portion and a portion of the second portion may be inserted into the aerosol generator 1. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generator 1. For example, opening and closing of the air passage formed in the aerosol generator 1 and/or the size of the air passage may be controlled by a user. Accordingly, the amount and smoothness of vapor may be adjusted by the user. In another example, the outside air may be introduced into the cigarette 2 through at least one hole formed in a surface of the cigarette 2.

Hereinafter, an example of the cigarette 2 will be described with reference to FIGS. 4 and 5.

Figure 4:
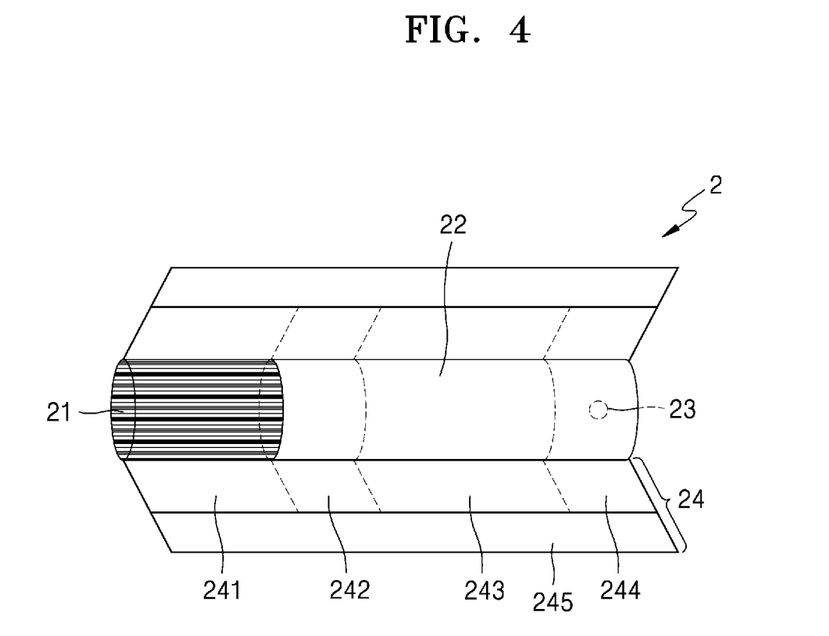
FIGS. 4 and 5 are diagrams showing examples of cigarettes.
Figure 5:
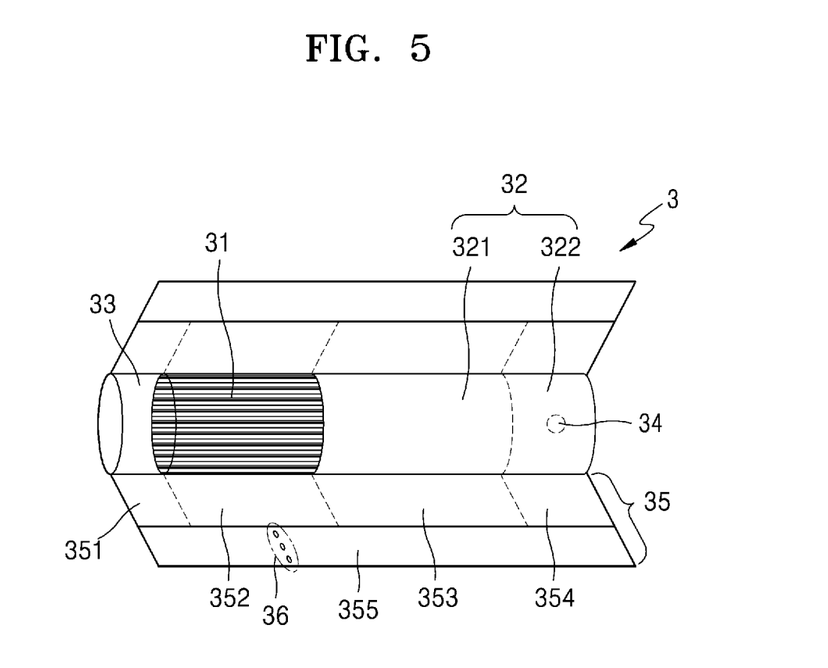

FIGS. 4 and 5 illustrate examples of a cigarette.

Referring to FIG. 4, the cigarette 2 includes a tobacco rod 21 and a filter rod 22. The first portion described above with reference to FIGS. 1 to 3 include the tobacco rod 21 and the second portion includes the filter rod 22.

In FIG. 4, the filter rod 22 is shown as a single segment, but is not limited thereto. In other words, the filter rod 22 may include a plurality of segments. For example, the filter rod 22 may include a first segment for cooling down the aerosol and a second segment for filtering a predetermined component included in the aerosol. Also, if necessary, the filter rod 22 may further include at least one segment performing other functions.

The cigarette 2 may be packaged by at least one wrapper 24. The wrapper 24 may include at least one hole through which the outside air is introduced or inside air is discharged. For example, the cigarette 2 may be packaged by one wrapper 24. In another example, the cigarette 2 may be packaged by two or more wrappers 24. For example, the tobacco rod 21 may be packaged by a first wrapper 241, and the filter rod 22 may be packaged by wrappers 242, 243, and 244. And the entire cigarette 2 may be packaged by a single wrapper 245. When the filter rod 22 includes a plurality of segments, each segment may be packaged by separate wrappers 242, 243, and 244.

The tobacco rod 21 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 21 may include other additive materials like a flavoring agent, a wetting agent, and/or an organic acid. Also, a flavoring liquid such as menthol, humectant, etc. may be added to the tobacco rod 21 by being sprayed to the tobacco rod 21.

The tobacco rod 21 may be manufactured variously. For example, the tobacco rod 21 may be fabricated as a sheet or a strand. Also, the tobacco rod 21 may be fabricated by tobacco leaves that are obtained by fine-cutting a tobacco sheet. Also, the tobacco rod 21 may be surrounded by a heat conducting material. For example, the heat-conducting material may be, but is not limited to, a metal foil such as aluminum foil. For example, the heat conducting material surrounding the tobacco rod 21 may improve a thermal conductivity applied to the tobacco rod by evenly dispersing the heat transferred to the tobacco rod 21, and thereby improving tobacco taste. Also, the heat conducting material surrounding the tobacco rod 21 may function as a susceptor that is heated by an inducting heating type heater. Although not shown in the drawings, the tobacco rod 21 may further include a susceptor, in addition to the heat conducting material surrounding the outside thereof.

The filter rod 22 may be a cellulose acetate filter. In addition, the filter rod 22 is not limited to a particular shape. For example, the filter rod 22 may be a cylinder type rod or a tube type rod including a cavity therein. Also, the filter rod 22 may be a recess type rod. When the filter rod 22 includes a plurality of segments, at least one of the plurality of segments may have a different shape from the others.

Also, the filter rod 22 may include at least one capsule 23. Here, the capsule 23 may generate flavor or may generate aerosol. For example, the capsule 23 may have a structure, in which a liquid containing a flavoring material is wrapped with a film. The capsule 23 may have a circular or cylindrical shape, but is not limited thereto.

Referring to FIG. 5, the cigarette 3 may further include a front-end filter 33. The front-end plug 33 may be located on a side of the tobacco rod 31, the side not facing the filter rod 32. The front-end plug 33 may prevent the tobacco rod 31 from being detached and may prevent the liquefied aerosol from flowing from the tobacco rod 31 into an aerosol generating device (1 of FIGS. 1 to 3) during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and the total length of the cigarette 3 may correspond to the diameter and the total length of the cigarette 2 of FIG. 4.

The cigarette 3 may be wrapped by at least one wrapper 35. At least one hole through which external air flows in or internal gas flows out may be formed in the wrapper 35. For example, the front-end plug 33 may be wrapped by a first wrapper 351, the tobacco rod 31 may be wrapped by a second wrapper 352, the first segment 321 may be wrapped by a third wrapper 353, and the second segment 322 may be wrapped by a fourth wrapper 354. Also, the entire cigarette 3 may be re-wrapped by a fifth wrapper 355.

Also, at least one perforation 36 may be formed in the fifth wrapper 355. For example, the perforation 36 may be formed in a region surrounding the tobacco rod 31, but is not limited thereto. The perforation 36 may serve to transfer heat generated by the heater 13 shown in FIGS. 2 and 3 into the tobacco rod 31.

Also, the second segment 322 may include at least one capsule 34. Here, the capsule 34 may serve to generate a flavor or aerosol. For example, the capsule 34 may have a structure in which a liquid containing perfume is wrapped in a film. The capsule 34 may have a spherical or cylindrical shape, but is not limited thereto.

Figure 6:
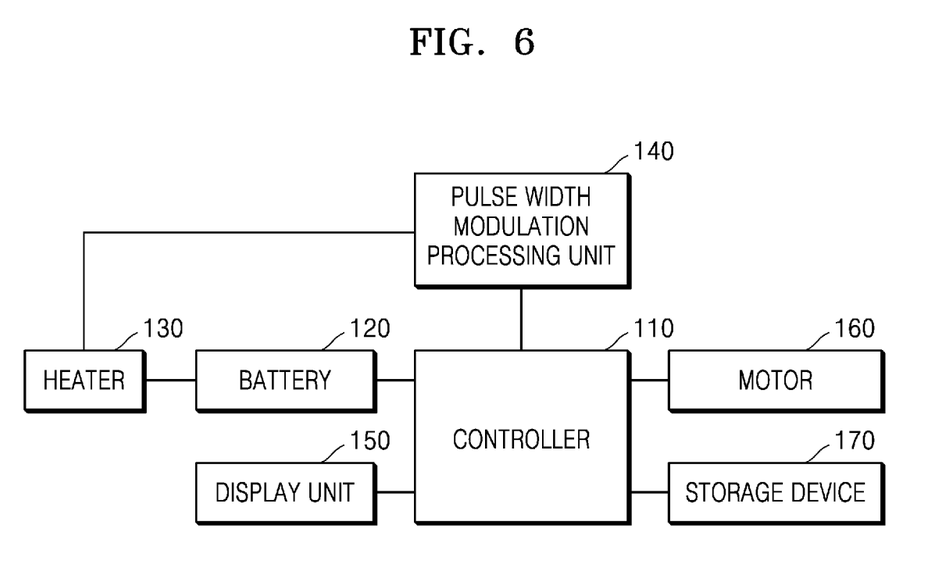
FIG. 6 is a diagram schematically showing a block diagram of an example of an aerosol generating device according to the present disclosure.

FIG. 6 is a diagram schematically showing a block diagram of an example of an aerosol generating device according to the present disclosure.

Referring to FIG. 6, it may be seen that the aerosol generating device according to the present disclosure includes a controller 110, a battery 120, a heater 130, a pulse width modulation processing unit 140, a display unit 150, a motor 160, and a storage device 170. In FIG. 6, the controller 110, the battery 120, and the heater 130 are considered to correspond to the controller 12, the battery 11, and the heater 13 described in FIGS. 1 to 3, respectively.

The controller 110 controls the battery 120, the heater 130, the pulse width modulation processing unit 140, the display unit 150, the motor 160, and the storage device 170 included in the aerosol generating device as a whole. Although not illustrated in FIG. 6, depending on an embodiment, the controller 110 may further include an input receiving unit (not shown) that receives a user's button input or touch input, and a communication unit (not shown) capable of performing communication with an external communication device such as a user terminal. Although not shown in FIG. 6, the controller 110 may further include a module for performing proportional integral derivative (PID) control on the heater 130.

In addition to the overall control of the battery 120, the heater 130, the pulse width modulation processing unit 140, the display unit 150, the motor 160, and the storage device 170, in particular, the controller 110 may receive a change in the strength of an internal magnetic field inside the aerosol generating device detected by a plurality of geomagnetic sensors, detect in real time that a detachable element is detached from the aerosol generating device, and provide an alarm to the user through the display unit 150, the motor 160, and the like. For convenience of description, the plurality of geomagnetic sensors are not illustrated in FIG. 6, and will be described below with reference to FIGS. 7 and 8.

The battery 120 supplies power to the heater 130, and the amount of the power supplied to the heater 130 may be controlled by the controller 110.

When a current flows through the heater 130, the heater 130 generates heat by its specific resistance, and when the aerosol generating substrate contacts (combines with) the heated heater, aerosol may be generated.

The pulse width modulation processing unit 140 transmits a pulse width modulation (PWM) signal to the heater 130 so that the controller 110 may control the power supplied to the heater 130. Depending on an embodiment, the pulse width modulation processing unit 140 may be implemented in the controller 110.

The display unit 150 visually outputs various alarm messages generated by the aerosol generating device to allow a user who uses the aerosol generating device to notice the alarm messages. The user may check a battery power shortage message or a heater overheat warning message output to the display unit 150, and take appropriate actions before the operation of the aerosol generating device is stopped or the aerosol generating device is damaged.

The motor 160 is driven by the controller 110 so that the user may recognize through tactile sense that the aerosol generating device is ready for use.

The storage device 170 stores various information that the controller 110 may use to properly control the power supplied to the heater 130 such that various flavors may be provided to the user who uses the aerosol generating device. For example, the storage device 170 may store in advance a temperature profile which the controller 12 refers to in order to appropriately control the temperature of the heater over time, a control reference ratio which will be described later, and a comparison control value, etc. When the controller 110 requests, the storage device 170 may transmit the corresponding information to the controller 110. The storage device 170 may be composed of a volatile memory that temporarily stores data only when power is supplied in order to secure a faster data input/output (I/O) speed, as well as a non-volatile memory such as a flash memory.

The controller 110, the pulse width modulation processing unit 140, the display unit 150, and the storage device 170 according to an embodiment of the present disclosure may correspond to at least one processor or include at least processor. Accordingly, the controller 110, the pulse width modulation processing unit 140, the display unit 150, and the storage device 170 may be driven in a form included in hardware devices such as a microprocessor or a general purpose computer system.

Figure 7:
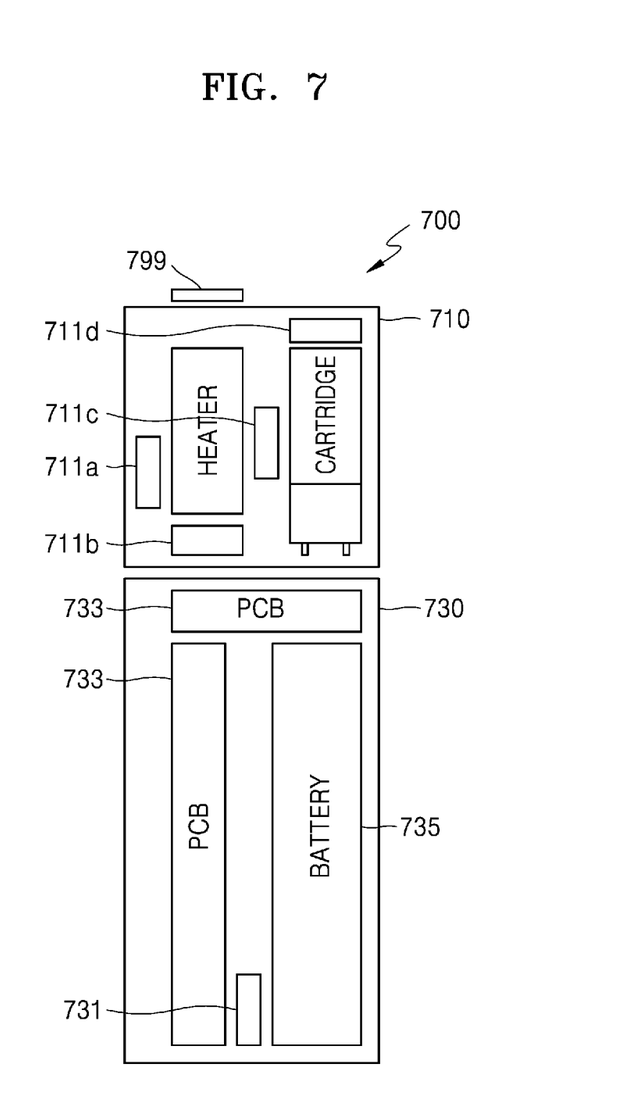
FIG. 7 is a block diagram of still another embodiment of the aerosol generating device according to the present disclosure.

FIG. 7 is a block diagram of another embodiment of the aerosol generating device according to the present disclosure.

Referring to FIG. 7, it can be seen that the aerosol generating device 700 according to the present disclosure includes a heater unit 710 including a heater and a battery unit 730 including a battery. In FIG. 7, the aerosol generating device 700 is divided into the heater unit 710 and the battery unit 730 for convenience of description. In FIG. 7, configurations known to be generally included in the aerosol generating device 700 are considered to be omitted.

The heater unit 710 includes the heater that generates aerosol by heating an aerosol generating substrate and a liquid cartridge storing a liquid composition, and at least two geomagnetic sensors. A cigarette containing the aerosol generating substrate may be inserted into a cigarette insertion port of the heater unit 710. The cigarette insertion port may be covered with a cigarette insertion port dedicated cap 799 to prevent foreign substances from entering through the cigarette insertion port while the user does not use the aerosol generating device.

A first geomagnetic sensor 711a is one of the geomagnetic sensors positioned close to the heater. The first geomagnetic sensor 711a in a position close to the heater detects a change in the strength of the magnetic field generated when the cigarette inserted into the cigarette insertion port contacts the heater, and transmits the detection result to the controller. As an example of the type of change in the strength of the magnetic field detected by the first geomagnetic sensor 711a, a magnetic field of a constant strength is formed by the magnetic substance present in the aerosol generating device before the cigarette is inserted into the cigarette insertion port. In this situation, when the cigarette is inserted into the cigarette insertion port, the change in the strength of the magnetic field may occur. As another example, a magnetic field that did not exist before the cigarette was inserted into the cigarette insertion port may be generated when the cigarette is inserted through the cigarette insertion port.

The controller receives the detection result from the first geomagnetic sensor 711a and may determine that the cigarette is inserted into or extracted from the cigarette insertion port of the aerosol generating device. Here, the cigarette is an example of a detachable element that may be attached to and detached from the aerosol generating device.

The second geomagnetic sensor 711b is another one of the geomagnetic sensors positioned close to the heater. The second geomagnetic sensor 711b is similar to the first geomagnetic sensor 711a in that it is located closest to the heater. However, the second geomagnetic sensor 711b may be distinguished from the first geomagnetic sensor 711a in that the second geomagnetic sensor 711b becomes closer to the cigarette as the cigarette moves into the cigarette insertion port and the distance from the cigarette is minimal when the cigarette is completely attached to the inner space of the aerosol generating device. The controller may receive the detection result from the second geomagnetic sensor 711b, and determine whether the cigarette is completely attached to the inner space of the aerosol generating device.

In another embodiment, the controller may determine whether the cigarette is completely attached to the inner space of the aerosol generating device based on the detection results received from the first geomagnetic sensor 711a and the second geomagnetic sensor 711b. According to this embodiment, the controller may accurately determine whether the cigarette is completely attached to the inner space of the aerosol generating device by considering not only the detection result from the second geomagnetic sensor 711b but also the change in the strength of the magnetic field detected by the first geomagnetic sensor 711a.

A third geomagnetic sensor 711c is one of the geomagnetic sensors located between the heater and the liquid cartridge. The third geomagnetic sensor 711c detects the strength of the internal magnetic field of the aerosol generating device that changes as the liquid cartridge is detached and transmits the detected result to the controller.

A fourth geomagnetic sensor 711d is one of the geomagnetic sensors, which is located between the liquid cartridge and the cigarette insertion port dedicated cap 799. The fourth geomagnetic sensor 711d detects the strength of the internal or external magnetic field of the aerosol generating device that changes depending on the opening and closing of the cigarette insertion port dedicated cap 799, and transmits the detection result to the controller.

In FIG. 7, the number of the first geomagnetic sensors 711a to the fourth geomagnetic sensors 711d included in the heater unit 710 is illustrated as one. However, in the present disclosure, since the number of geomagnetic sensors is not limited to a specific number, each of first geomagnetic sensors 711a to fourth geomagnetic sensors 711d may be plural, depending on embodiments. As an example, there may be five first geomagnetic sensors 711a, three second geomagnetic sensors 711b, and two fourth geomagnetic sensor 711d. Since the sensitivity of the geomagnetic sensor is superior to that of a hall sensor sensing on the similar principle or a general magnetic sensor, the controller may accurately determine whether or not the detachable element is detached from the aerosol generating device by superimposing the geomagnetic sensors as described above.

In addition, in the heater unit 710, a sensing target (the heater, the cartridge, and the cigarette insertion port dedicated cap) in which the geomagnetic sensor detects a change in the strength of the magnetic field includes a magnetic material. In more detail, the sensing target of the geomagnetic sensor in the heater unit 710 may be coated with magnetic ink or may include fine magnet fragments so that the sensing target generates a magnetic field on its own.

The battery unit 730 may include a fifth geomagnetic sensor 731, at least one PCB 733, and a battery 735.

The fifth geomagnetic sensor 731 is one of the geomagnetic sensors, which is located between the PCB 733 and the battery 735. The fifth geomagnetic sensor 731 detects the strength of the internal magnetic field of the aerosol generating device that changes as the battery is attached or detached, and transmits the detection result to the controller.

The PCB 733 is a substrate including a controller that controls the power of the battery to be properly supplied to the heater. The PCB 733 collectively refers to hardware that enables the heater unit 710 and the battery unit 730 to operate in cooperation when the heater unit 710 is coupled to the battery unit 730.

The battery 735 is designed to be attached to and detached from the battery unit 730 and supplies power to various devices included in the aerosol generating device.

In FIG. 7, the number of the fifth geomagnetic sensor 731 included in the battery unit 730 is illustrated as one, but the number of geomagnetic sensors in the present disclosure is not limited to a specific number. Therefore, the number of the fifth geomagnetic sensors 731 may be plural, depending on embodiment.

In addition, in the battery unit 730, the battery 735, which is an object from which the geomagnetic sensor detects a change in the strength of the magnetic field, includes a magnetic material. In more detail, the battery may be coated with the magnetic ink, or may include fine magnet fragments, so that the battery may form the magnetic field on its own even if the battery is not magnetized by a magnet.

Hereinafter, a process in which the aerosol generating device according to the present disclosure operates is described with reference to FIGS. 6 and 7 according to embodiments.

As an exemplary embodiment, the aerosol generating apparatus according to the present disclosure may include the heater 130 for heating the aerosol generating substrate to generate aerosol, the controller 110 for controlling power supplied to the heater 130, at least one detachable element that may be attached to and detached from an inner space or an outer space of the aerosol generating device, and a plurality of geomagnetic sensors that detect a change in the strength of the internal magnetic field of the aerosol generating device. In this embodiment, the controller may detect the detachment of the detachable element, based on the detection result from at least one of the plurality of geomagnetic sensors. Examples of the detachable element may include, as described above with reference to FIG. 7, a cigarette containing an aerosol generating substrate, a liquid cartridge storing a liquid composition, a cigarette insertion dedicated cap, and a battery.

As an embodiment, when the change in the strength of the internal magnetic field of the aerosol generating device exceeds a preset value, the controller may identify a combination of the geomagnetic sensors that have detected the change in the strength of the magnetic field, and determine the detachable element that caused the strength change of the magnetic field, based on the identified combination. In more detail, if a change in magnetic field strength is detected by at least one geomagnetic sensor among a plurality of geomagnetic sensors included in the aerosol generating device, and the detected change in magnetic field strength exceeds a preset value, the controller may determine whether a detachable element is additionally coupled to the aerosol generating device, or whether a detachable element is detached from the aerosol generating device. Also, the controller may identify the detachable element that caused the change in the magnetic field strength by tracking which geomagnetic sensor has detected the change in magnetic field strength. According to the present exemplary embodiment, the controller identifies the combination of the geomagnetic sensors that have detected the change in the magnetic field strength only when there is the strength change exceeding a preset value, rather than any change in the magnetic field strength, and determines whether the detachable element has been detached based on the identified combination. Therefore, it is possible to significantly lower the false detection rate of the controller.

As another embodiment, the detachable element in the aerosol generating device according to the present disclosure may be a cigarette including the aerosol generating substrate, and the cigarette may include at least one of copper, ferrite, and martensite. Copper, ferrite, and martensite are ferromagnetic materials, and when a cigarette containing the magnetic material is inserted into the aerosol generating device, the strength of the internal magnetic field of the aerosol generating device may be changed. In this embodiment, the copper, ferrite, and martensite contained in the cigarette are magnetized in advance by a magnet or the like through the manufacturing process of the cigarette.

In another embodiment, the detachable element of the aerosol generating device according to the present disclosure may be a cigarette including the aerosol generating substrate, and the cigarette may include a magnet having constant magnetic force, in addition to at least one of copper, ferrite, martensite, and aluminum. According to this embodiment, as the cigarette contains a magnet, there is no need to go through a process in which copper, ferrite and martensite are magnetized in advance. Also, aluminum contained in cigarettes in the form of aluminum foil may be used as a material for inducing the change in the strength of the internal magnetic field of the aerosol generating device, although it is not ferromagnetic.

As an exemplary optional embodiment, the controller may receive the result of the strength change of the internal magnetic field of the aerosol generating device from the plurality of geomagnetic sensors, estimate the type of magnetic material contained in the cigarette based on the strength change value of the internal magnetic field, and control the power supplied to the heater in consideration of the temperature profile of the heater corresponding to the estimated magnetic material. In this case, the controller may use a temperature profile table that is stored in advance, or may modify an existing temperature profile in consideration of the thermal conductivity efficiency of the estimated magnetic material.

Figure 8:
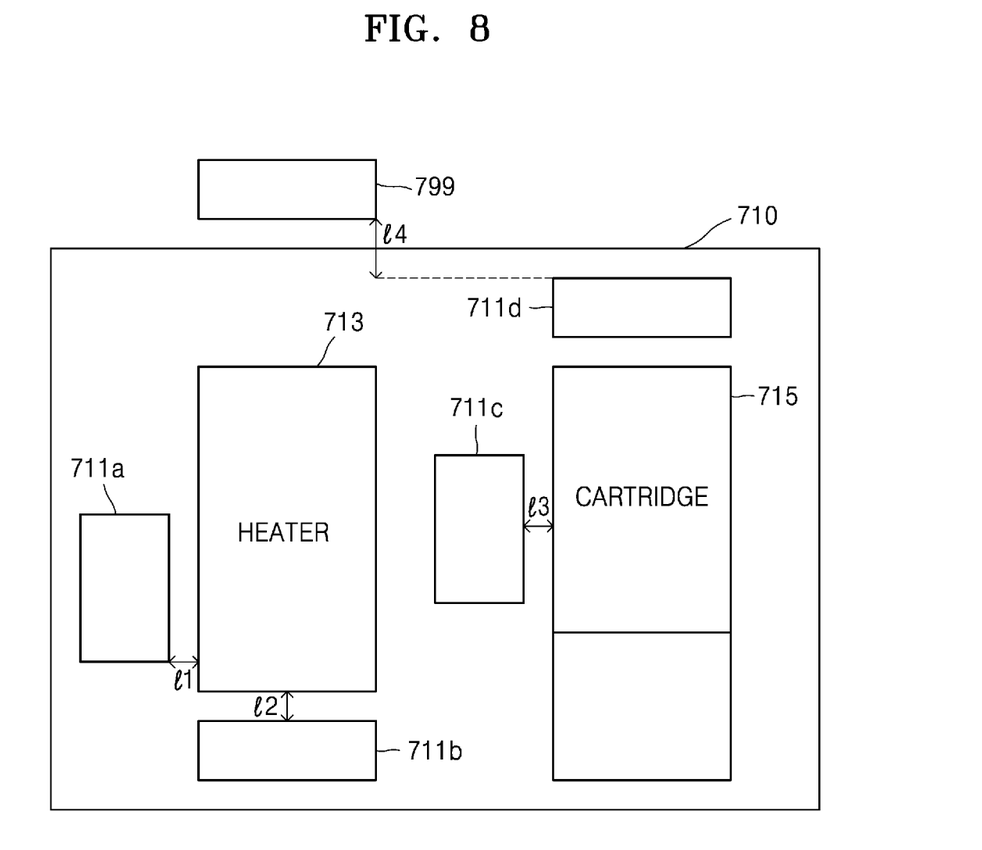
FIG. 8 is a diagram showing in detail the heater included in the aerosol generating device according to the present disclosure.

FIG. 8 is a diagram showing in detail the heater included in the aerosol generating device according to the present disclosure.

FIG. 8 is a view for explaining the heater unit 710 described in FIG. 7 in more detail, and will be described with reference to FIG. 7. Hereinafter, descriptions overlapping with those described in FIG. 7 will be omitted.

As an exemplary embodiment of the present disclosure, the detachable element of the aerosol generating device may be a cigarette containing an aerosol generating substrate. The controller may determine whether the cigarette has passed through the cigarette insertion port to access the heater, based on a detection result from the geomagnetic sensor disposed at a first distance from the heater. In this embodiment, the controller detects whether the cigarette is inserted into the aerosol generating device. When the magnetic field strength existing in the inner space of the aerosol generating device is changed by the magnetic material containing the cigarette, or when a magnetic field that has not existed in the inner space of the aerosol generating device is generated by the magnetic material containing the cigarette, a process of the geomagnetic sensor detecting the change in the magnetic field strength and transmitting it to the controller is executed as one cycle.

Here, the first distance is a distance corresponding to 11 in FIG. 8, a distance allowing the geomagnetic sensor to detect the magnetic field strength changed by the cigarette approaching the heater without being affected by attachment or detachment of detachable elements other than the cigarette approaching the heater. The first distance may be a specific constant value determined mathematically, empirically, or experimentally. The geomagnetic sensor in this embodiment may be the first geomagnetic sensor 711*a* in FIG. 8.

As another embodiment of the present disclosure, the detachable element of the aerosol generating device may be the cigarette containing an aerosol generating substrate, and the controller may determine whether or not the cigarette is completely attached to the heater, based on a detection result from the geomagnetic sensor disposed at a second distance from the heater. In this embodiment, the controller detects whether the cigarette is completely inserted into the inner space of the aerosol generating device after the cigarette has been inserted into the aerosol-generating device. In the embodiment, when the magnetic field strength existing in the inner space of the aerosol generating device is changed by the magnetic material containing the cigarette, or when a magnetic field that has not existed in the inner space of the aerosol generating device is generated by the magnetic material containing the cigarette, a process of the geomagnetic sensor detecting the change in the magnetic field strength and transmitting it to the controller is executed as one cycle.

Here, the second distance is a distance corresponding to 12 in FIG. 8, a distance allowing the geomagnetic sensor to detect the magnetic field strength changed by the cigarette completely attached to the heater without being affected by attachment or detachment of detachable elements other than the cigarette completely attached to the heater. The second distance may be a specific constant value determined mathematically, empirically, or experimentally. The geomagnetic sensor in this embodiment may be the second geomagnetic sensor 711b in FIG. 8.

As still another embodiment of the present disclosure, the detachable element of the aerosol generating device may be the cigarette containing an aerosol generating substrate, and the controller may determine whether or not the cigarette is completely attached to the heater, based on a combination of the detection result from the geomagnetic sensor disposed at the first distance from the heater and the detection result from the geomagnetic sensor disposed at the second distance from the heater. In this embodiment, the controller detects whether the cigarette is completely inserted into the inner space of the aerosol generating device after the cigarette has been inserted into the aerosol-generating device. In the embodiment, when the existing magnetic field strength in the inner space of the aerosol generating device is changed by the magnetic material containing the cigarette, or when a magnetic field that has not existed in the inner space of the aerosol generating device is generated by the magnetic material containing the cigarette, a process of the geomagnetic sensor detecting the change in the magnetic field strength and transmitting it to the controller is executed as one cycle. Unlike the above-described embodiments, this embodiment may be distinguished in that the detection results from a plurality of geomagnetic sensors are combined to determine whether or not the cigarette is completed attached to the heater.

The geomagnetic sensors this embodiment may be the first geomagnetic sensor 711a and the second geomagnetic sensor 711b in FIG. 8. In addition, if the first geomagnetic sensor 711a is plural and the second geomagnetic sensor 711b is plural, the combination of the geomagnetic sensors detected by the controller be a combination of a portion of the first geomagnetic sensor 711a and a portion of the second geomagnetic sensor 711b.

In addition, in the still another optional embodiment, the first distance 11 and the second distance 12 may be the same.

As still another embodiment, the detachable element of the aerosol generating device may be a liquid cartridge that stores a liquid composition, and the controller may determine whether the liquid cartridge is completely attached to the heater, based on a detection result from the geomagnetic sensor disposed at a first distance from the heater. In this embodiment, the controller detects whether the liquid cartridge is completely installed in the aerosol generating device or completely removed from the aerosol generating device. In this embodiment, when the existing magnetic field strength in the inner space of the aerosol generating device is changed by the magnetic material contained in the surface or inside of the liquid cartridge, or when a magnetic field that has not existed in the inner space of the aerosol generating device is generated by the magnetic material contained in the surface or inside of the liquid cartridge, a process of the geomagnetic sensor detecting the change in the magnetic field strength and transmitting it to the controller is executed as one cycle. The magnetic material included in the surface or inside of the liquid cartridge may be the above-described copper, ferrite, martensite, or the like.

Here, the first distance is a distance corresponding to 13 in FIG. 8, a distance that allows the geomagnetic sensor to detect the internal magnetic field strength changed by the liquid cartridge completely attached to or detached from the heater without being affected by attachment or detachment of detachable elements other than the liquid cartridge. The first distance may be a specific constant value determined mathematically, empirically, or experimentally. The geomagnetic sensor in this embodiment may be the second geomagnetic sensor 711c in FIG. 8.

As still another embodiment, the detachable element of the aerosol generating device may be a cap 799 covering a cigarette insertion port through which a cigarette is inserted to contact the heater, and the controller may determine whether the cap 799 is opened or closed, based on a change of the magnetic field strength detected by the fourth geomagnetic sensor 711d disposed at a first distance from the cap. In this embodiment, the controller detects whether the cap is opened or closed in the aerosol generating device. In this embodiment, when the existing magnetic field strength in the inner space of the aerosol generating device is changed by the magnetic material contained in the surface or inside of the cap, or when a magnetic field that does not exist in the inner space of the aerosol generating device is generated by the magnetic material contained in the surface or inside of the cap, a process of the fourth geomagnetic sensor detecting the change in the magnetic field strength and transmitting it to the controller is executed as one cycle. The magnetic material included in the surface or inside of the cap 799 may be the above-described copper, ferrite, martensite, or the like.

Here, the first distance is a distance corresponding to 14 in FIG. 8, a distance that allows a fourth geomagnetic sensor to detect the internal magnetic field strength changed by the cap 799 that is opened and closed without being affected by attachment or detachment of detachable elements other than the cap 799. The first distance 14 may be a specific constant value determined mathematically, empirically, or experimentally.

In addition, although not illustrated in FIG. 8, the fifth geomagnetic sensor 731 may be disposed at a first distance from the battery, detect a change in the magnetic field strength, and transmit the detection result to the controller, so that the controller may determine whether the battery is detached or not.

Figure 9:
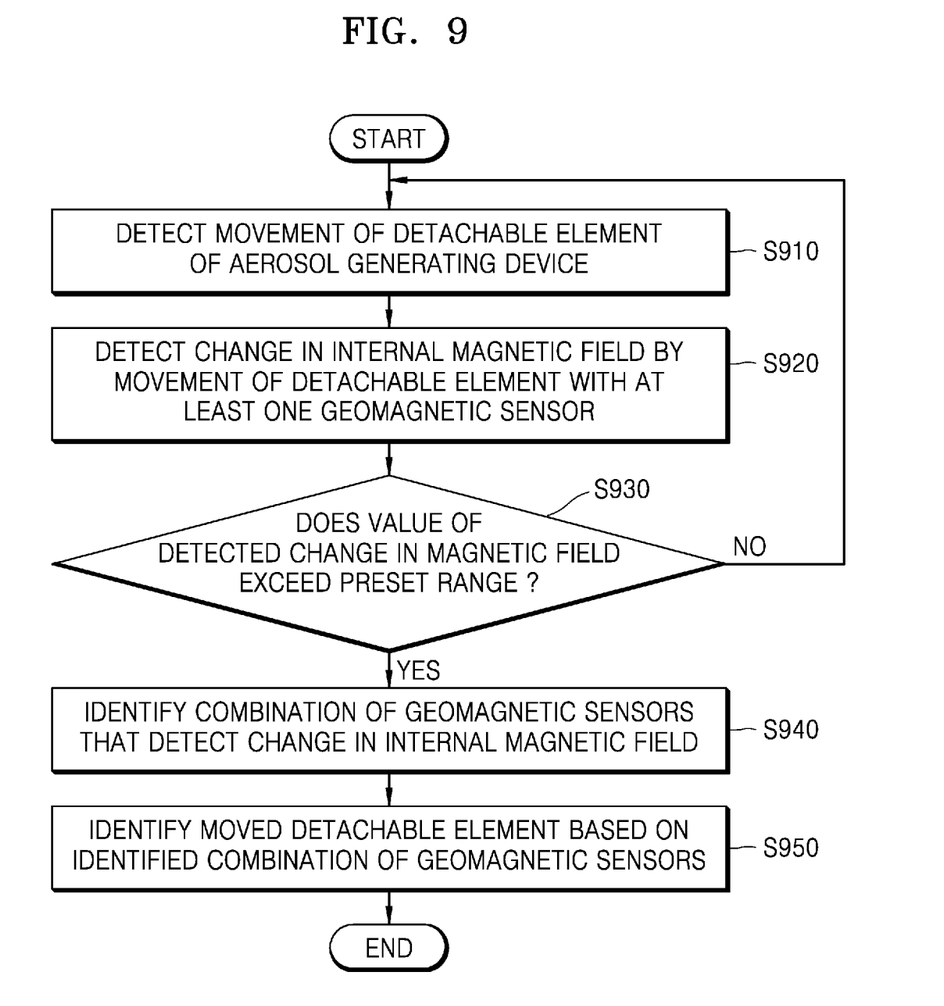
FIG. 9 is a flowchart illustrating an example of a method of controlling an aerosol generating device with a plurality of geomagnetic sensors according to the present disclosure.

FIG. 9 is a flowchart illustrating an example of a method of controlling an aerosol generating device with a plurality of geomagnetic sensors according to the present disclosure.

The method according to FIG. 9 may be implemented by the aerosol generating device according to FIG. 5, and thus is described with reference to FIG. 5. Hereinafter, descriptions overlapping with those described in FIGS. 5 to 8 are omitted.

In step S910, the sensor provided in the aerosol generating device detects the movement of the detachable element of the aerosol generating device. In step S910, the sensor that detects the movement of the detachable element may be an air flow sensor, a temperature sensor, a gyro sensor, etc., and the movement of the detachable element includes attachment to and detachment from the aerosol generating device.

When the movement of the detachable element is detected, the sensor provided in the aerosol generating device may transmit the detection result to the controller, so that the geomagnetic sensor in the sleep mode is activated. Step S910 may be omitted depending on an embodiment.

Subsequently, in step 920, when the at least one geomagnetic sensor detect a change in the internal magnetic field due to the movement of the detachable element, in step 930, the controller 12 determines whether the value of the detected change in the magnetic field exceeds a preset range.

In step 940, the controller 12 identifies a combination of geomagnetic sensors that detect a change in the internal magnetic field strength, and in step 950, the controller 12 identifies a detachable element (a cigarette, a liquid cartridge, and a cap of a cigarette insertion port) that has been coupled to or detached from the aerosol generating device based on the identified combination of geomagnetic sensors.

According to the present disclosure, by controlling the operation of the aerosol generating device, based on the results sensed by a plurality of geomagnetic sensors having highly sensitivity, the error rate of the controller is lowered. Also, the user may be provided with a message accurately informing the situation of the detachable element being attached to or detached from the aerosol generating device.

One or more embodiments described above may be implemented in the form of a computer program that may be executed on a computer through various components, and such a computer program may be recorded in a computer-readable recording medium. At this time, the computer-readable recording medium may be a magnetic medium (e.g., a hard disk, a floppy disk, and a magnetic tape), an optical recording medium (e.g., a CD-ROM and a DVD), a magneto-optical medium (e.g., a floptical disk), and a hardware device specifically configured to store and execute program instructions (e.g., a ROM, a RAM, and a flash memory).

Meanwhile, the computer program recorded on the medium may be specially designed and configured for example embodiments or may be published and available to one of ordinary skill in computer software. Examples of computer programs include machine language code such as code generated by a compiler, as well as high-level language code that may be executed by a computer using an interpreter or the like.

Specific implementations described in one or more embodiments are examples, and do not limit the scope of one or more embodiments in any way. For brevity of description, descriptions of conventional electronic components, control systems, software, and other functional aspects of the systems may be omitted. Furthermore, the connecting lines, or connectors shown in the various figures presented are intended to represent exemplary functional relationships and/or physical or logical couplings between the various elements, and it should be noted that many alternative or additional functional relationships, physical connections or circuit connections may be present in a practical device. Moreover, no item or component is essential to the practice of one or more embodiments unless the element is specifically described as "essential" or "critical".

The use of the terms "a" and "an" and "the" and similar referents in the context of describing one or more embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. One or more embodiments are not limited to the described order of the steps. The use of any and all examples, or exemplary language (e.g., "such as") provided herein, is intended merely to better illuminate the present disclosure and does not pose a limitation on the scope of one or more embodiments unless otherwise claimed. Numerous modifications and adaptations will be readily apparent to one of ordinary skill in the art without departing from the spirit and scope of one or more embodiments.

INDUSTRIAL APPLICABILITY

One embodiment of the present disclosure may be used to produce next-generation electronic cigarettes with increased user convenience.

What is claimed is:

1. An aerosol generating device comprising:
    a heater configured to generate aerosol by heating an aerosol generating substrate;
    a controller configured to control power supplied to the heater;
    at least one detachable element that is attachable to and detachable from an inner space or an outer space of the aerosol generating device; and
    a plurality of geomagnetic sensors configured to detect a change in strength of an internal magnetic field of the aerosol generating device;
    wherein the plurality of geomagnetic sensors comprise a first geomagnetic sensor and a second geomagnetic sensor, and
    wherein the controller is further configured to:
    determine whether the at least one detachable element has passed through a predetermined area of the inner space or the outer space, based on a detection result from the first geomagnetic sensor, and
    determine whether the at least one detachable element is completely attached to the inner space or the outer space, based on a detection result from the second geomagnetic sensor.

2. The aerosol generating device of claim 1, wherein the controller, based on the change in the strength of the internal magnetic field strength of the aerosol generating device exceeding a preset value, identifies a combination of the geomagnetic sensors detecting the change, and identifies a detachable element that has been detached from the aerosol generating device based on the identified combination.

3. The aerosol generating device of claim 1, wherein the at least one detachable element includes a cigarette containing the aerosol generating substrate, and
    the controller determines whether the cigarette has passed through a cigarette insertion port to access the heater, based on a detection result from a geomagnetic sensor disposed at a first distance from the heater.

4. The aerosol generating device of claim 3, wherein the controller determines whether the cigarette is completely attached to the heater, based on a detection result from a geomagnetic sensor disposed at a second distance from the heater.

5. The aerosol generating device of claim 3, wherein the cigarette includes at least one of copper, ferrite, and martensite.

6. The aerosol generating device of claim 3, wherein the cigarette includes a magnet and at least one of aluminum, copper, ferrite, and martensite which are magnetizable by the magnet.

7. The aerosol generating device of claim 1, wherein
the at least one detachable element includes a cigarette containing the aerosol generating substrate, and
the controller determines whether the cigarette is completely attached to the heater based on a combination of a detection result from a geomagnetic sensor disposed at a first distance from the heater and a detection result from a geomagnetic sensor disposed at a second distance from the heater.

8. The aerosol generating device of claim 1, wherein
the at least one detachable element includes a liquid cartridge that stores a liquid composition, and
the controller determines whether the liquid cartridge is detached based on a detection result from a geomagnetic sensor disposed at a first distance from the heater.

9. The aerosol generating device of claim 1, wherein
the at least one detachable element includes a cap covering a cigarette insertion port through which a cigarette is inserted to contact the heater, and
the controller determines whether the cap is attached or detached, based on a detection result from a geomagnetic sensor disposed at a first distance from the cap.

10. The aerosol generating device of claim 1, wherein
the at least one detachable element includes a battery that supplies power to the heater, and
the controller determines whether the battery is attached or detached, based on a detection result from a geomagnetic sensor disposed at a first distance from the battery.

11. A method of controlling an aerosol generating device with a plurality of geomagnetic sensors, the method comprising:
detecting detachment of at least one detachable element that is attachable to and detachable from an inner space or an outer space of the aerosol generating device;
detecting, with the plurality of geomagnetic sensors, a change in strength of an internal magnetic field of the aerosol generating device due to the detachment; and
identifying the at least one detachable element based on a detection result from at least one of the plurality of geomagnetic sensors,
wherein the plurality of geomagnetic sensors comprise a first geomagnetic sensor and a second geomagnetic sensor, and
wherein the identifying of the detachable element comprises:
determining whether the at least one detachable element has passed through a predetermined area of the inner space or the outer space, based on a detection result from the first geomagnetic sensor, and
determining whether the at least one detachable element is completely attached to the inner space or the outer space, based on a detection result from the second geomagnetic sensor.

12. The method of claim 11, wherein the identifying of the detachable element includes, based on the change in the strength of the internal magnetic field exceeding a preset value, identifying a combination of the geomagnetic sensors detecting the change, and identifying the at least one detached detachable element based on the identified combination.

13. The method of claim 11, wherein
the at least one detachable element includes a cigarette containing an aerosol generating substrate, and
the identifying of the at least one detachable element includes determining whether the cigarette has passed through a cigarette insertion port to access a heater, based on a detection result from a geomagnetic sensor disposed at a first distance from the heater.

14. The method of claim 13, wherein the identifying of the at least one detachable element includes determining whether the cigarette is completely attached to the heater, based on a detection result from a geomagnetic sensor disposed at a second distance from the heater.

15. The method of claim 13, wherein the cigarette includes at least one of copper, ferrite, and martensite.

16. The method of claim 13, wherein the cigarette includes a magnet and at least one of aluminum, copper, ferrite, and martensite which are magnetizable by the magnet.

17. The method of claim 11, wherein
the at least one detachable element includes a cigarette containing an aerosol generating substrate, and
the identifying of the at least one detachable element includes determining whether the cigarette is completely attached to a heater based on a combination of a detection result from a geomagnetic sensor disposed at a first distance from the heater and a detection result from a geomagnetic sensor disposed at a second distance from the heater.

18. The method of claim 11, wherein
the at least one detachable element includes a liquid cartridge that stores a liquid composition, and
the identifying of the at least one detachable element includes determining whether the liquid cartridge is detached based on a detection result from a geomagnetic sensor disposed at a first distance from a heater.

19. The method of claim 11, wherein
the at least one detachable element includes a cap covering a cigarette insertion port through which a cigarette is inserted to contact a heater, and
the identifying of the at least one detachable element includes determining whether the cap is attached or detached, based on a detection result from a geomagnetic sensor disposed at a first distance from the cap.

20. The method of claim 11, wherein
the at least one detachable element includes a battery that supplies power to a heater, and
the identifying of the at least one detachable element includes determining whether the battery is attached or detached, based on a detection result from a geomagnetic sensor disposed at a first distance from the battery.

* * * * *